United States Patent
Zeon et al.

(10) Patent No.: US 9,452,819 B2
(45) Date of Patent: Sep. 27, 2016

(54) FLIGHT CONTROL SURFACE SEAL

(71) Applicant: The Boeing Company, Chicago, IL (US)

(72) Inventors: Young L. Zeon, Edmonds, WA (US); Gerfried R. Achtner, Mukilteo, WA (US); Robert M. Lee, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 96 days.

(21) Appl. No.: 14/223,062

(22) Filed: Mar. 24, 2014

(65) Prior Publication Data

US 2015/0266563 A1 Sep. 24, 2015

(51) Int. Cl.
| | |
|---|---|
| *B64C 1/38* | (2006.01) |
| *B64C 3/50* | (2006.01) |
| *B64C 7/00* | (2006.01) |
| *B64C 9/02* | (2006.01) |
| *F16J 15/02* | (2006.01) |

(52) U.S. Cl.
CPC . *B64C 1/38* (2013.01); *B64C 3/50* (2013.01); *B64C 7/00* (2013.01); *B64C 9/02* (2013.01); *F16J 15/027* (2013.01)

(58) Field of Classification Search
USPC ............................. 244/130, 131; 277/644
See application file for complete search history.

(56) References Cited

U.S. PATENT DOCUMENTS

| | | | | |
|---|---|---|---|---|
| 2,981,504 A | * | 4/1961 | Parker | 244/117 R |
| 3,038,217 A | * | 6/1962 | Harris | 428/121 |
| 3,756,529 A | * | 9/1973 | Backlund et al. | 244/87 |
| 3,999,930 A | * | 12/1976 | Telbizoff | 425/394 |
| 4,034,939 A | * | 7/1977 | Ridley et al. | 244/87 |
| 4,050,208 A | * | 9/1977 | Pompei et al. | 52/460 |
| 4,079,985 A | * | 3/1978 | Martin | 296/190.03 |
| 4,189,120 A | * | 2/1980 | Wang | 244/214 |
| 4,189,121 A | * | 2/1980 | Harper et al. | 244/214 |
| 4,219,203 A | * | 8/1980 | Lovelace et al. | 277/637 |
| 4,226,553 A | * | 10/1980 | Whipps et al. | 405/106 |
| 4,618,109 A | * | 10/1986 | Victor | 244/130 |
| 4,712,752 A | * | 12/1987 | Victor | 244/129.1 |
| 4,741,542 A | * | 5/1988 | Kimerly | 277/316 |
| 4,848,962 A | * | 7/1989 | Whipps | 405/106 |
| 5,096,350 A | * | 3/1992 | Peterson | 411/12 |
| 5,146,668 A | * | 9/1992 | Gulistan | 29/525 |
| 5,388,788 A | * | 2/1995 | Rudolph | 244/215 |

(Continued)

FOREIGN PATENT DOCUMENTS

| | | |
|---|---|---|
| EP | 0781704 A1 | 7/1997 |
| FR | 2944332 A1 | 10/2010 |

OTHER PUBLICATIONS

Extended European Search Report in European Patent Application No. 15156160.2, dated Aug. 3, 2015.

*Primary Examiner* — Medhat Badawi

(74) *Attorney, Agent, or Firm* — McDonnell Boehnen Hulbert & Berghoff LLP

(57) ABSTRACT

A system and method for reducing aerodynamic drag is disclosed. A compression seal is attached to the inboard edges of the stabilizer and elevators of an airplane. The seal blocks airflow in a gap located between these inboard edges and a fuselage. The shape of the compression seal changes as the shape of the gap changes due to movement of the stabilizer and elevators during flight to effectively block airflow through the gap during flight. By blocking the airflow, the seal reduces the aerodynamic drag of the airplane.

18 Claims, 4 Drawing Sheets

(56) References Cited

U.S. PATENT DOCUMENTS

| | | | |
|---|---|---|---|
| 5,681,013 A * | 10/1997 | Rudolph | 244/214 |
| 5,943,908 A * | 8/1999 | Innes et al. | 73/290 R |
| 6,328,513 B1 * | 12/2001 | Niwa et al. | 411/339 |
| 6,655,635 B2 * | 12/2003 | Maury et al. | 244/131 |
| 7,059,816 B2 * | 6/2006 | Toosky | 411/181 |
| 7,156,599 B2 * | 1/2007 | Clinch et al. | 411/111 |
| 7,575,404 B2 * | 8/2009 | Toosky et al. | 411/113 |
| 7,591,622 B2 * | 9/2009 | de Jesus et al. | 411/111 |
| 7,611,099 B2 | 11/2009 | Kordel et al. | |
| 7,699,266 B2 * | 4/2010 | Martin Hernandez | 244/131 |
| 7,850,119 B2 * | 12/2010 | Martin Hernandez | 244/131 |
| 8,096,500 B2 * | 1/2012 | Burgos Gallego et al. | 244/89 |
| 8,277,158 B2 * | 10/2012 | Csik et al. | 411/111 |
| 8,506,222 B2 * | 8/2013 | Reid et al. | 411/111 |
| 8,727,280 B1 * | 5/2014 | Lutke et al. | 244/123.11 |
| 2002/0005461 A1 * | 1/2002 | Nettle et al. | 244/214 |
| 2002/0145299 A1 * | 10/2002 | Henderson | 296/61 |
| 2005/0025606 A1 * | 2/2005 | Toosky | 411/181 |
| 2005/0229558 A1 * | 10/2005 | Stelzer et al. | 55/385.3 |
| 2007/0034747 A1 * | 2/2007 | Amorosi et al. | 244/215 |
| 2007/0224016 A1 * | 9/2007 | Toosky et al. | 411/108 |
| 2010/0147999 A1 | 6/2010 | Burgos Gallego et al. | |
| 2011/0150599 A1 * | 6/2011 | Bakken et al. | 411/183 |
| 2012/0317787 A1 * | 12/2012 | Ross et al. | 29/522.1 |
| 2013/0074410 A1 * | 3/2013 | Berkeland | 49/142 |
| 2013/0167505 A1 * | 7/2013 | Gormley | 60/226.1 |
| 2013/0272778 A1 * | 10/2013 | Smith et al. | 403/266 |
| 2014/0283363 A1 * | 9/2014 | Wilkerson et al. | 29/525.02 |
| 2014/0339370 A1 * | 11/2014 | De Gregorio Hurtado et al. | 244/35 R |

* cited by examiner

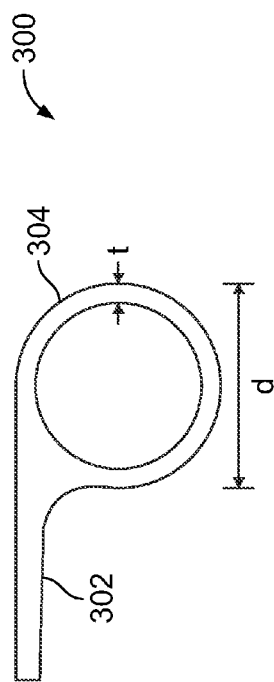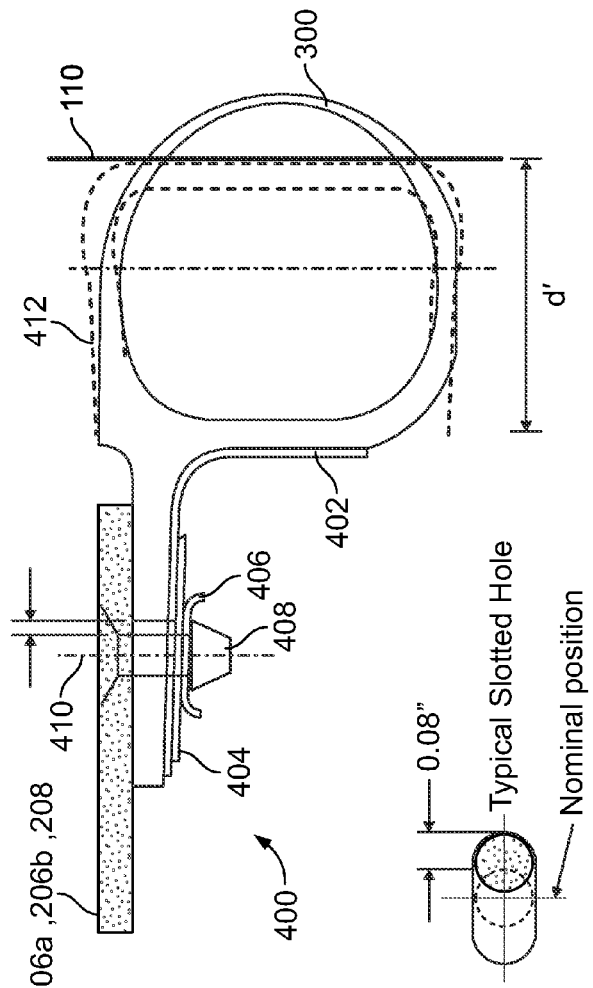

FLIGHT CONTROL SURFACE SEAL

FIELD

The disclosure is related to reducing aerodynamic drag of an airplane and, more particularly, to flight control surface seals that reduce aerodynamic drag.

BACKGROUND

An airplane includes flight control surfaces that a pilot can adjust to control the aircraft's flight attitude. Airplane design determines what flight control surfaces are available on a particular airplane. Typical flight control surfaces include the wing's slats, flaps, spoilers, and ailerons; vertical and horizontal stabilizers; rudders, and elevators.

A horizontal stabilizer is a horizontal wing attached to the aft end of the fuselage of an airplane to trim the airplane about the longitudinal axis by providing a stabilizing force to the aft end of the airplane. While some horizontal stabilizers are fixed, others can be moved during flight. These movable horizontal stabilizers, which may be referred to as variable incidence horizontal stabilizers, allow the pilot to adjust the angle of the horizontal stabilizer based on the aircraft's longitudinal stability parameters, such as center of gravity location.

Elevators are flight control surfaces that control the aircraft's longitudinal attitude by changing the vertical loads on the aft end of the fuselage. Elevators are usually hinged to the aft end of the horizontal stabilizer.

Since these movable horizontal stabilizers and elevators move relative to the fuselage, a gap exists between these flight control surfaces and the fuselage except at the point where the surface is attached to the fuselage (i.e., the pivot point of the surface). Since most aft fuselages are convex curved about the longitudinal axis of the airplane, the gap between the movable horizontal stabilizer inboard edge and the fuselage is not constant. This gap normally increases as the stabilizer is moved more from its neutral position. This is also true of the elevator. As the size of the gap increases, so too does the aerodynamic drag of the airplane, which impacts the performance of the airplane.

SUMMARY

A system and method for reducing aerodynamic drag of an airplane is disclosed. The system includes a flight control surface of an airplane and a seal connected to the flight control surface. The seal blocks airflow through a gap located between the flight control surface and a fixed structure of the airplane. In a preferred embodiment, the flight control surface is a horizontal stabilizer or an elevator, the fixed structure is a fuselage, and the seal is a bulb seal.

The method includes placing an exterior surface of a seal adjacent to an inboard edge of a flight control surface of an airplane, positioning a fastener adjacent to an opposite exterior surface of the seal, and attaching the seal to the flight control surface with the fastener. The seal fills a gap located between the flight control surface and a fixed structure of the airplane. The method further includes applying a low friction coating, such as Teflon® paint, on the fixed structure.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Presently preferred embodiments are described below in conjunction with the appended drawing figures, wherein like reference numerals refer to like elements in the various figures, and wherein:

FIG. 3 is an illustration of a cross-sectional view of a seal, according to an example;

FIG. 4 is an illustration of a cross-sectional view of a fastener for attaching the seal to the horizontal stabilizer and the elevator, according to an example;

Figure 1:
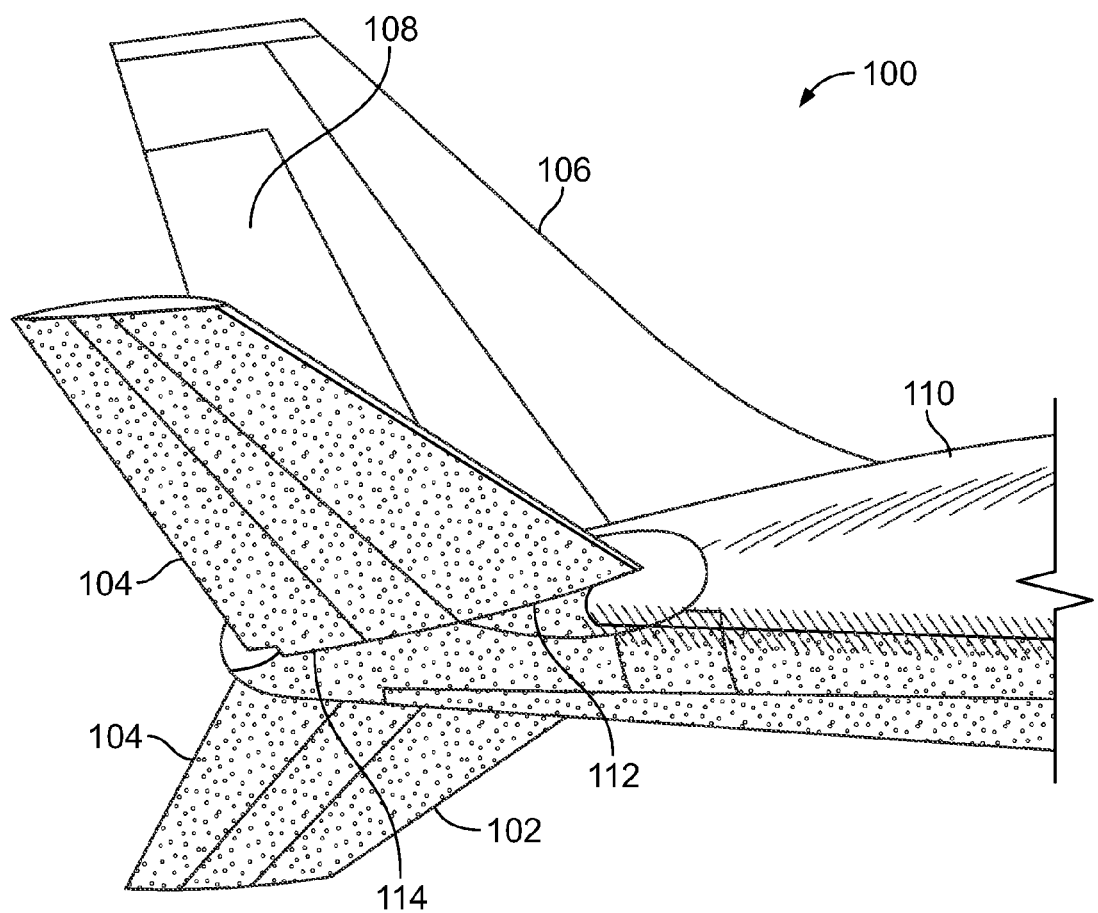
FIG. 1 is an illustration of an empennage of an airplane, according to an example.

The drawings are for the purpose of illustrating example embodiments, but it is understood that the inventions are not limited to the arrangements and instrumentality shown in the drawings.

DETAILED DESCRIPTION

FIG. 1 is an illustration of an empennage 100 of an airplane. The empennage 100, also known as the tail or tail assembly, contributes to the stability and the control of the airplane. The empennage 100 includes a horizontal stabilizer 102 with elevators 104. The empennage 100 also includes a vertical stabilizer 106 with a rudder 108. The horizontal stabilizer 102 and vertical stabilizer 104 are connected to a fuselage 110 of the airplane.

As the horizontal stabilizer 102 and the elevators 104 move relative to the fuselage 110, a gap between the fuselage 110 and either the horizontal stabilizer 102 or elevators 104 changes size. To reduce aerodynamic drag, a seal is attached to inboard edges 112 of the horizontal stabilizer 102 and inboard edges 114 of the elevators 104. The seal expands and compresses as the gap changes size to block airflow between these flight control surfaces 102, 104 and the fuselage 110.

Figure 2:
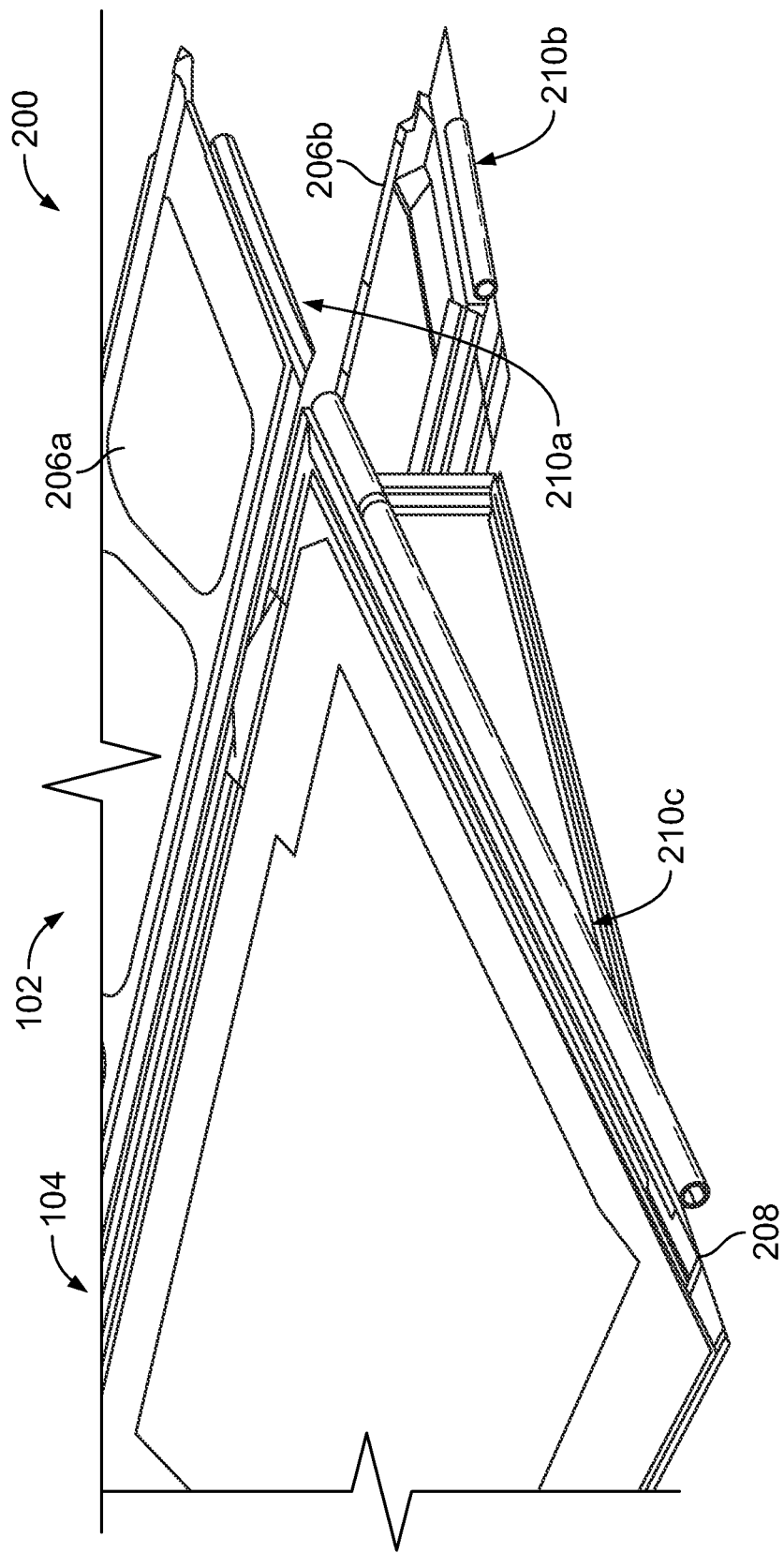
FIG. 2 is an illustration of an isometric view of a horizontal stabilizer and an elevator, according to an example.

FIG. 2 is an isometric view 200 of the horizontal stabilizer 102 and the elevator 104. The view 200 depicts trailing edge panels 206a and 206b of the horizontal stabilizer 102 and an elevator panel 208 of the elevator 104. Seals 210a and 210b are attached to each of the panels 206a and 206b, respectively. A seal 210c is also attached to the elevator panel 208.

FIG. 3 is a cross-sectional view of a seal 300 that may be used for the seals 210a, 210b, and 210c. The seal 300 is a compression seal and is depicted in FIG. 3 as a bulb seal and, in particular, a P-bulb seal. The bulb seal is flexible and changes shape as pressures are exerted on the exterior of the seal 300. The flexible nature of the seal 300 allows it to expand and contract to fill the variability of the gap throughout the normal range of the horizontal stabilizer 102 and elevator 104. Other flexible seal types may also be used.

The dimensions of the seal 300 depend on the design of the airplane and, more specifically, the size of the gap between the flight control surfaces 102, 104 and the fuselage 110 as the flight control surfaces 102, 104 move. As the elevator 104 typically has a greater range of motion than the horizontal stabilizer 102, different seal dimensions may be used for the different panels 206*a*, 206*b*, and 208. For example, the diameter of the bulb may be larger for the seal 210*c* attached to the elevator panel 208 than the seals 210*a* and 210*b* attached to the trailing edge panels 206*a* and 206*b*.

In one example, the diameter (d) of the bulb from the exterior edges of the bulb may be approximately 1.8" and the thickness of the bulb wall (t) may be approximately 0.08" when not subjected to external forces. In other examples, the diameter (d) may be between 1" and 3" and the bulb wall thickness (t) may be between 0.5" and 1.5". In other examples, the diameter (d) may be between 0.5" and 5" and the bulb thickness (t) may be between 0.1" and 2".

The P-bulb seal includes an attachment surface 302, sometimes referred to as a handle or lip. The attachment surface 302 facilitates attachment of the seal 300 to the panels 206*a*, 206*b*, and 208. While other mechanisms and surfaces may be used to attach the seal 300 to the panels 206*a*, 206*b*, and 208, P-bulb seals are readily available and convenient to use.

The seal 300 is composed of a non-metallic material, preferably, silicone. In a preferred embodiment, the seal is composed of BMS 1-57 Type 2 silicone. Other non-metallic materials, such as rubber, may also be used.

The seal 300 may also be covered with an external covering 304, such as a polyester fabric or other protective material. For example, the external covering 304 may include one or more layers of Mohawk D2000 Dacron® fabric or HT 2002 Nomex® fabric. Preferably, the external covering 304 has two reinforced plies of one of these two fabrics. In this example, the thickness of the external covering 304 is approximately 0.12". In other examples, the thickness of the external covering 304 may be between 0.05" and 0.25".

The bulb seal 300 is attached to the panels 206, 208 with a row of fasteners. In one example, the fasteners are spaced 1.875" apart. In other examples, the fasteners are spaced between 1.5" and 2" apart. In other examples, the fasteners are spaced between 1" and 3" apart.

FIG. 4 is a cross-sectional view of a fastener 400. The fastener 400 includes a seal retainer 402, a nut plate retainer strip 404, a nut plate 406, and a bolt 408. A slotted hole 410 is located in the seal 300 and the seal retainer 402. While FIG. 4 depicts a typical slotted hole, other dimensions are suitable.

The seal retainer 402 provides support to the seal 300 as external pressures from the fuselage 110 deform the seal 300. In one example, the seal retainer 402 is formed using one or more layers of carbon or carbon composite fabric. Preferably, the seal retainer 402 is formed from four plies of carbon composite fabric (e.g., BMS 8-256) having a thickness of approximately 0.034". In other examples, the thickness of the seal retainer 402 may be between 0.02" and 0.05" or between 0.01" and 0.1". Additionally, in other examples, the seal retainer 402 may be formed using one or more layers of fiberglass fabric, such as 4-ply 181 fiberglass fabric, or other suitable materials.

The nut plate retainer strip 404 is located between the seal retainer 402 and the nut plate 406. A bolt 408 attaches the seal retainer 402 to the panels 206, 208. The size of the bolt depends on the type of nut plate 406 selected. Preferably, the bolt is a 3/16" bolt, but other bolt types may also be used. In one example, a 3/16" titanium BACB30VF bolt is used in a BACN11G nut plate. The slotted holes 410 in the seal 300 and the seal retainer 402 allow the bolt 408 to slide left and right as the bolt 408 is installed. While a slotted hole is not necessary, it is easier to install the bolt 408 with this ability to adjust the location of the bolt 408 within the slotted holes 410.

To attach the seal 300 to the panels 206, 208, an installer places an exterior surface of the attachment surface 302 adjacent to the inboard edges 112, 114 of the panels 206, 208 such that the seal 300 extends from the panels 206, 208 and contacts the fuselage 110. During installation, the seal 300 is compressed against the fuselage 210. The amount of compression is based on the range of motion of the flight control surfaces 102, 104 and the maximum width of the gap expected.

The installer positions the fastener 400 adjacent to an opposite side of the exterior of the attachment surface 302 aligning the slotted holes 410 in the seal 300 and the seal retainer 402. The installer then positions the nut plate strip 404 and the nut plate 406 on the seal retainer 402. The installer then installs bolts 408 through the nut plate 406, the nut plate strip 404, the seal retainer 402, and the panels 206, 208.

While FIG. 4 depicts a particular fastener design, it is understood that other attachment mechanisms may be used. It is also understood that the fastener 400 may be modified to include more or less components. The fastener 400 may also use different materials and dimensions than described herein.

FIG. 4 also depicts how the seal 300 changes shape based on external pressures. As the seal 300 is pressed against the side of the fuselage 110 when the panels 206, 208 move closer to the fuselage 110, the seal 300 deforms as shown by the dotted deformation line 412. For example, the diameter (d') of the bulb from the exterior edges of the bulb may be reduced from 1.8" to 1.5". While this is only one example, it shows how the seal 300 is able to block the airflow between the fuselage 110 and the panels 206, 208 as the gap size changes.

In addition to the contact pressure from the fuselage 110, the seal 300 is also subjected to friction as it moves along the fuselage 110. To reduce friction, a low friction coating may be applied to the fuselage 110. For example, a polytetrafluoroethylene (PTFE) (i.e., Teflon®) coating or paint may be applied to the fuselage.

Figure 5:
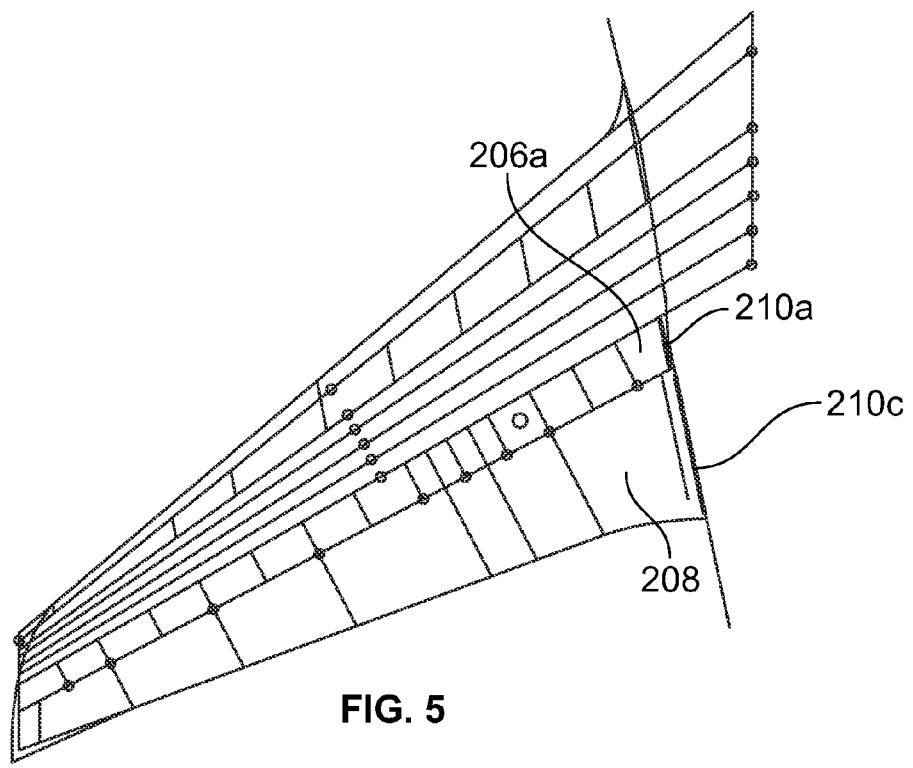
FIG. 5 is an illustration of a view looking down on the stabilizer and elevator identifying a location for attaching the seal, according to an example.
Figure 6:
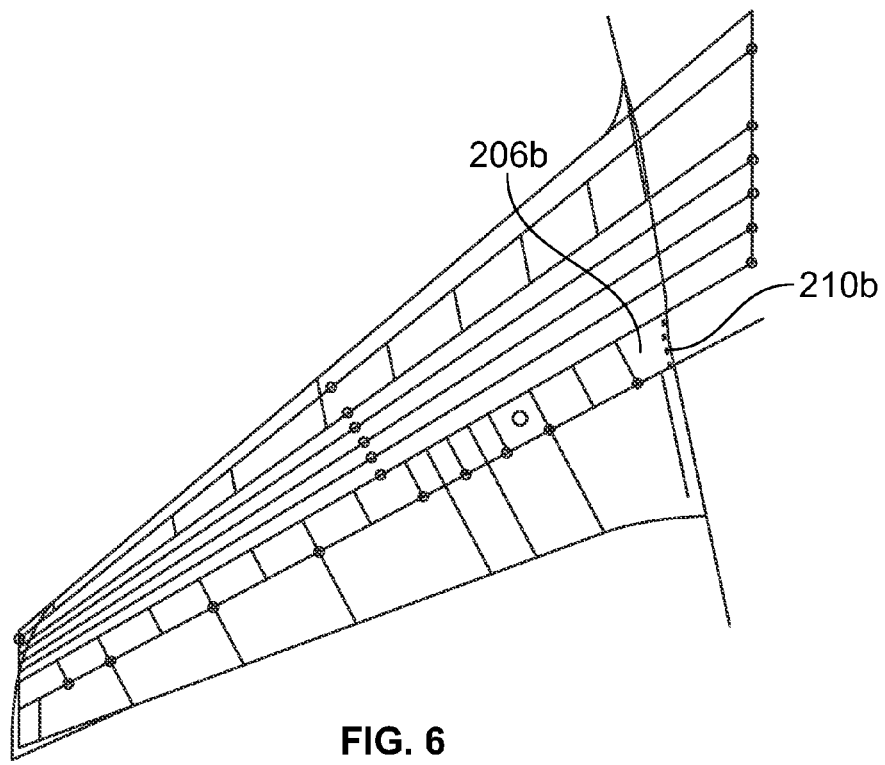
FIG. 6 is an illustration of a view looking up on the stabilizer and elevator identifying a location for attaching the seal, according to an example.

The seal 300 was flight tested on an on a Boeing 787-9 airplane. FIG. 5 depicts where the seal 210*a* was attached to the trailing edge panel 206*a* of the horizontal stabilizer 102 and the seal 210*c* was attached to the elevator panel 208 of the elevator 104. FIG. 6 depicts where the seal 210*b* was attached to the trailing edge panel 206*b* of the horizontal stabilizer 102. Flight test data confirms that the seal 300 reduces aerodynamic drag. Test results showed that the seal 300 improved drag by an equivalent of 600 pounds of airplane weight. This improvement results in a more fuel efficient operation of the airplane.

While the seal was tested on a Boeing 787-9 airplane, the use of the seal 300 is not limited to any particular type of airplane. For example, the seal 300 may be used on private airplanes and military airplanes, e.g., tanker aircraft, in addition to commercial airplanes. Moreover, the seal 300 can be retrofitted onto older airplanes that are currently operating without the seal 300.

While the seal 300 was described with respect to the horizontal stabilizer 102 and the elevators 104, the seal 300 may be useful for reducing drag between a fixed structure of the airplane (e.g., the fuselage 110, fixed wing portions) and other control surfaces. For example, the seal 300 may be attached to flight control surfaces associated with the wing (e.g., slats, flaps, spoilers, and ailerons) or the vertical stabilizer 106 (e.g., the rudder 108). As another example, the seal 300 may be useful for reducing drag between two control surfaces, such as between the horizontal stabilizer 102 and the elevators 104.

By reducing aerodynamic drag through the use of the seal 300, the airplane becomes more fuel efficient. Moreover, the fuel savings obtained from use of the seal 300 are much greater than the cost of adding the seal 300 to the airplane. As a result, the cost of operating the airplane and the impact to the environment is reduced.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A system for reducing aerodynamic drag, comprising:
   an adjustable flight control surface of an airplane;
   a bulb seal connected to the flight control surface such that the bulb seal blocks airflow through a non-constant gap located between the flight control surface and a fuselage of the airplane; and
   a fastener connecting the bulb seal to the flight control surface, the fastener including
      a non-metallic seal retainer extending along an attachment surface of the bulb seal, wherein the non-metallic seal retainer is configured to provide support to the bulb seal as external pressures from the fuselage deform the bulb seal,
      a nut plate retainer strip located between a nut plate and the seal retainer, and
      a bolt that connects the nut plate to the flight control surface through the nut plate retainer strip, the seal retainer, and the attachment surface of the bulb seal.

2. The system of claim 1, wherein the bulb seal is composed of a non-metallic material.

3. The system of claim 1, wherein the bulb seal is composed of silicone.

4. The system of claim 1, wherein the flight control surface is a horizontal stabilizer.

5. The system of claim 1, wherein the flight control surface is an elevator.

6. The system of claim 1, wherein the bulb seal is connected to the flight control surface with a row of fasteners through a seal retainer.

7. The system of claim 6, wherein the retainer is composed of a carbon composite fabric.

8. The system of claim 6, wherein the bulb seal and the seal retainer include slotted holes.

9. The system of claim 8, wherein the row of fasteners connects the seal retainer to the flight control surface through the slotted holes of the seal retainer and the bulb seal.

10. A method of reducing aerodynamic drag, comprising:
    placing an exterior surface of a handle of a P-bulb seal adjacent to an inboard edge of an adjustable flight control surface of an airplane;
    positioning a fastener adjacent to an opposite exterior surface of the handle of the P-bulb seal;
    locating a nut plate retainer strip between a nut plate and a non-metallic seal retainer;
    utilizing a bolt to connect the nut plate to the flight control surface through the nut plate retainer strip, the seal retainer, and the handle of a P-bulb seal; and
    attaching the handle of the P-bulb seal to the flight control surface with the fastener, wherein a bulb of the P-bulb seal fills a non-constant gap located between the flight control surface and a fuselage of the airplane, and
    wherein the non-metallic seal retainer is configured to provide support to the P-bulb seal as external pressures from the fuselage deform the P-bulb seal.

11. The method of claim 10, further comprising applying a low friction coating on the fuselage.

12. The method of claim 10, wherein the flight control surface is a trailing edge panel of a horizontal stabilizer.

13. The method of claim 10, wherein the flight control surface is an elevator panel of an elevator.

14. The method of claim 10, wherein the bulb of the P-bulb seal changes shape as the flight control surface moves relative to the fuselage during flight.

15. A system for reducing aerodynamic drag, comprising:
    a fuselage of an airplane;
    an adjustable flight control surface of the airplane, wherein a non-constant gap is located between the fuselage and the flight control surface;
    a seal attached to the flight control surface that contacts the fuselage as the flight control surface is adjustable during flight; and
    a fastener connecting the bulb seal to the flight control surface, the fastener including
       a non-metallic seal retainer extending along an attachment surface of the bulb seal, wherein the non-metallic seal retainer is configured to provide support to the bulb seal as external pressures from the fuselage deform the bulb seal,
       a nut plate retainer strip located between a nut plate and the seal retainer, and
       a bolt that connects the nut plate to the flight control surface through the nut plate retainer strip, the seal retainer, and the attachment surface of the bulb seal.

16. The system of claim 15, wherein the flight control surface is a horizontal stabilizer.

17. The system of claim 15, wherein the flight control surface is an elevator.

18. The system of claim 15, wherein the seal is a compression seal.

* * * * *